United States Patent [19]  
Daniels

[11] 3,898,904  
[45] Aug. 12, 1975

[54] SHEARING APPARATUS AND SHEET TRANSFER MECHANISM
[75] Inventor: Dennis Daniels, Bellevue, Wash.
[73] Assignee: U.S. Amada, Ltd., Seattle, Wash.
[22] Filed: Sept. 4, 1973
[21] Appl. No.: 393,891

[52] U.S. Cl. .................. 83/404.2; 83/694; 83/627; 83/566; 83/409
[51] Int. Cl. .......................... B26d 5/00; B26d 7/20
[58] Field of Search ...................... 83/694, 566–570, 83/627, 409, 404.2, 404, 277, 404.1

[56] References Cited
UNITED STATES PATENTS

| | | | |
|---|---|---|---|
| 1,897,203 | 2/1933 | Lenarth | 83/627 |
| 2,236,833 | 4/1941 | Pell et al. | 83/694 |
| 3,292,475 | 12/1966 | Ross | 83/566 |
| 3,691,887 | 9/1972 | Roch | 83/694 |

Primary Examiner—Donald R. Schran  
Attorney, Agent, or Firm—Seed, Berry, Vernon & Baynham

[57] ABSTRACT

A side feeding shearing apparatus is provided with an upper frame having a side opening to allow sheets to be swung between the shear punch and die to position the sheet for feeding past the shear punch. The shear punch is positioned below the sheet supporting surface of the shearing apparatus and is raised for shearing the sheets. Sheets are delivered to the shearing apparatus by a transfer mechanism that includes a base secured to an adjacent N.C. punch press. An arm which clamps the sheet is pivotally mounted on the base and the arm is accurately aligned on the base by a shot pin and corresponding aperture. Movement of the sheet through the shearing apparatus is provided by the sheet positioning means of the N.C. punch press.

12 Claims, 5 Drawing Figures

PATENTED AUG 12 1975 3,898,904
SHEET 2
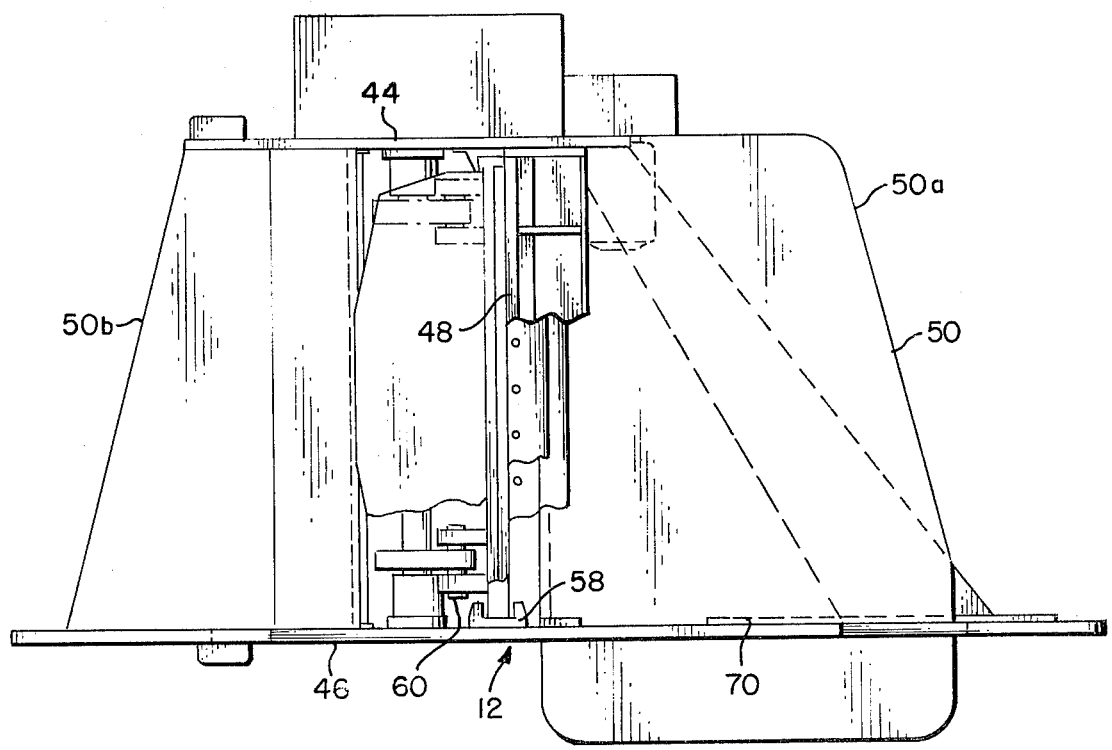
FIG. 2
FIG. 3
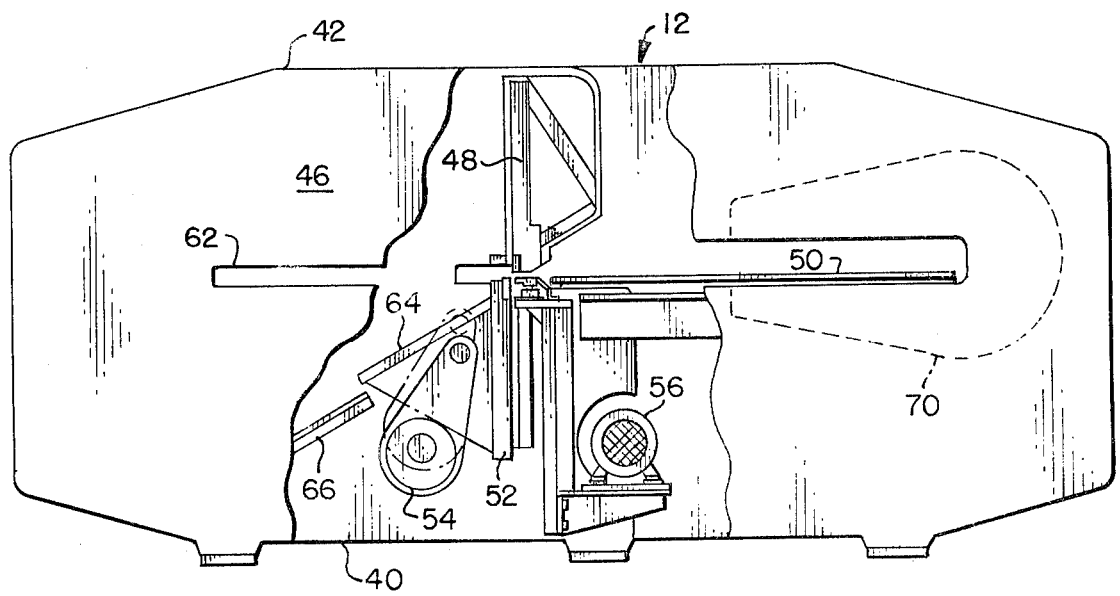

SHEARING APPARATUS AND SHEET TRANSFER MECHANISM

BACKGROUND OF THE INVENTION

1. Field of the Invention

This invention pertains to shearing apparatus for form-sustaining sheet materials and to improved sheet transfer mechanisms for transferring sheets from one machine to an adjacent machine.

2. Description of the Prior Art

Shearing apparatuses have heretofor been fed sheets generally by sliding them laterally or longitudinally onto the forward end of the shearing apparatus upstream from the shear punch. This feature of prior art machines has reduced their effectiveness since transfer of sheets into the apparatus has required time consuming labor intensive operations. Shear punches for these machines have generally been moved downwardly through the sheet to shear the sheet as it is fed between the shear punch and die. In some instances, the motor and drive for the shear punch have been located below the sheet supporting means on the shearing apparatus but in such cases, the shear has still been lowered during its cutting operation.

SUMMARY OF THE INVENTION

It is an object of this invention to provide a shearing apparatus having a side feed opening that allows sheets to be fed laterally past the shear punch and die while positioning the sheet for feeding.

It is another object of this invention to provide a shearing apparatus having an upwardly moved shear punch.

It is another object of this invention to provide a transfer mechanism which can accurately align the sheet relative to the transfer mechanism.

It is another object of this invention to provide a sheet transfer mechanism having an arm pivotally mounted on a base and providing means for accurately aligning the arm relative to the base.

It is still another object of this invention to provide an improved shearing apparatus for use in conjunction with an N.C. punch press.

Basically, the objects for the shearing apparatus are obtained by a unique upper frame mounted on the base of the shearing apparatus. The upper frame is provided with a vertical side frame having a large horizontal opening generally at a right angle to the shear punch and die. Sheets can then be fed laterally into the shearing apparatus through the side opening between the punch and the die. The side opening allows the effective use of a pivotal type sheet transfer mechanism and is especially useful when handling large size sheets, for example, 50 inches in length and width.

In the preferred embodiment, the shear punch is positioned below the sheet supporting means on the shearing apparatus and is raised for shearing the sheets. Positioning the shearing apparatus and the associated driving mechanism for the shear punch in the lower part of the apparatus reduces the requirement for a large massive upper frame on the shearing apparatus and allows larger sheets to be passed between the shear punch and the die when feeding sheets to the shearing apparatus.

When the shearing apparatus is used in conjunction with the preferred sheet transfer mechanism, the side opening on the shearing apparatus is effective to allow swinging of a sheet by a transfer arm from an adjacent machine. In the preferred form this adjacent machine is a numerically controlled punching apparatus. Accurate alignment is obtained between the transfer arm and the associated base of the transfer mechanism by a shot pin and aperture latch mechanism. The base of the transfer mechanism in the preferred embodiment is a part of the sheet positioning means on the adjacent N.C. punch press so that the sheet can also be accurately fed through the shearing apparatus with the N.C. controls of the punch press.

The sheet transfer mechanism with its accurately aligned transfer arm and base can also be used for transferring and accurately positioning the sheet between any two adjacent machines. That is, a sheet can be passed from one accurate positioning member on one machine to another accurate positioning member of an adjacent machine without losing alignment of the sheet during the transfer operation between the two machines.

BRIEF DESCRIPTION OF THE FIGURES OF THE DRAWINGS

FIG. 2 is a plan of the shearing apparatus shown in FIG. 1 with parts broken away for clarity.

FIG. 3 is a side elevation of the shearing apparatus shown in FIG. 1 with parts broken away for clarity.

DETAILED DESCRIPTION OF THE PREFERRED EMBODIMENTS

Figure 1:
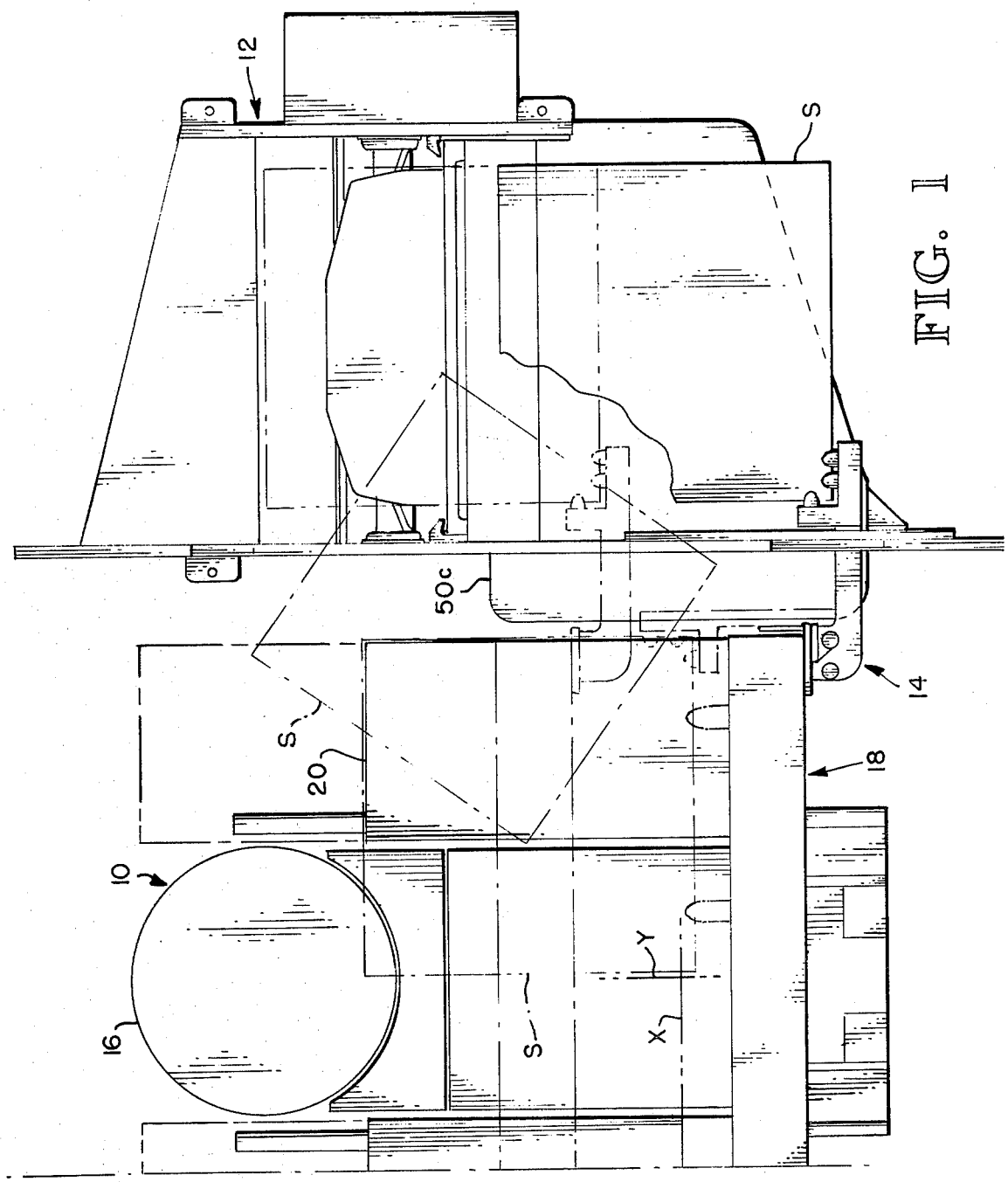
FIG. 1 is a plan view of preferred punching and shearing apparatuses embodying the principles of the invention.

As best shown in FIG. 1, the principles of the invention are used to best advantage in combined punching and shearing apparatuses or center which includes a punching apparatus 10 positioned closely adjacent a shearing apparatus 12. Preferably, the shearing apparatus is of the numerically controlled type in which a sheet can be automatically positioned beneath a punching turret in both the X and Y axes. Any conventional punching apparatus can be used for this purpose, a preferred type being illustrated in U.S. Pat. No. 3,717,061, the description of which is hereby incorporated by reference thereto. As used throughout this specification, the term numerically controlled is intended to mean programmed automatically controlled or manually remotely controlled machines well known in the art. The sheets are of the type that are self form-sustaining such as metal, plastic, wood or the like. Sheets are transferred between the punching apparatus and the shearing apparatus by a sheet transfer mechanism 14. The transfer mechanism is basically of the type illustrated in my U.S. Pat. application, Ser. No. 311,885, filed Dec. 4, 1972, the description of which is specifically incorporated by reference thereto. The transfer mechanism is most advantageously used in this application in conjunction with the numerical controls of the punch press to both transfer sheets between the punching apparatus and the shearing apparatus as well as to feed the sheet through the shearing operation. It should be understood, of course, that the specific details of the sheet transfer apparatus, as will be described below, are also advantageously employed independently of the punching apparatus for more general sheet transfer operations between any two adjacent machines having need for accurate positioning of the sheet in the two machines.

As is well understood, and described in more detail in said U.S. Pat. No. 3,717,061, the sheet punching apparatus 10 includes a turret 16 having a plurality of standard tools. The punch press also includes a standard workpiece positioning mechanism 18 for moving the workpiece or sheet along the X and Y axes of the punch press. In the preferred form, side tables 20 are provided which move with the workpiece positioning machine 18 in the Y axis. After the sheet is punched, it is delivered to the transfer mechanism 14 for subsequent delivery to the shearing apparatus 12.

Figure 4:
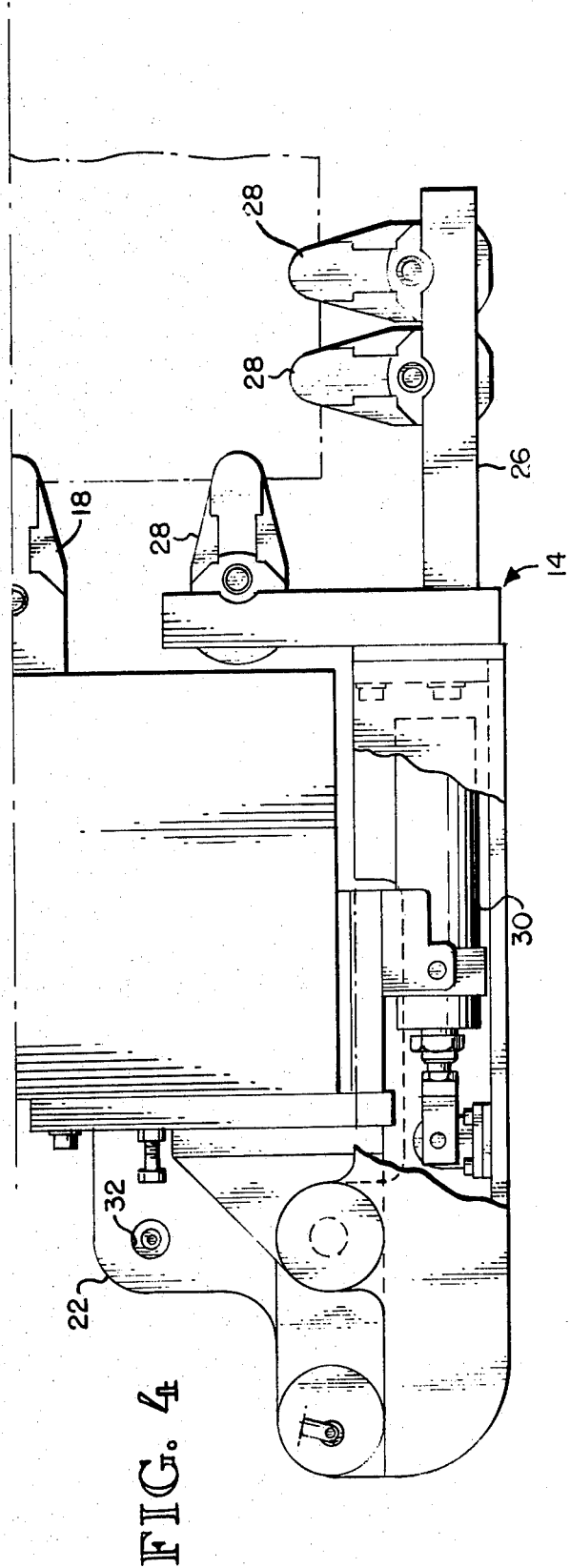
FIG. 4 is a plan view of a preferred form of sheet transfer mechanism with parts broken away for clarity.
Figure 5:
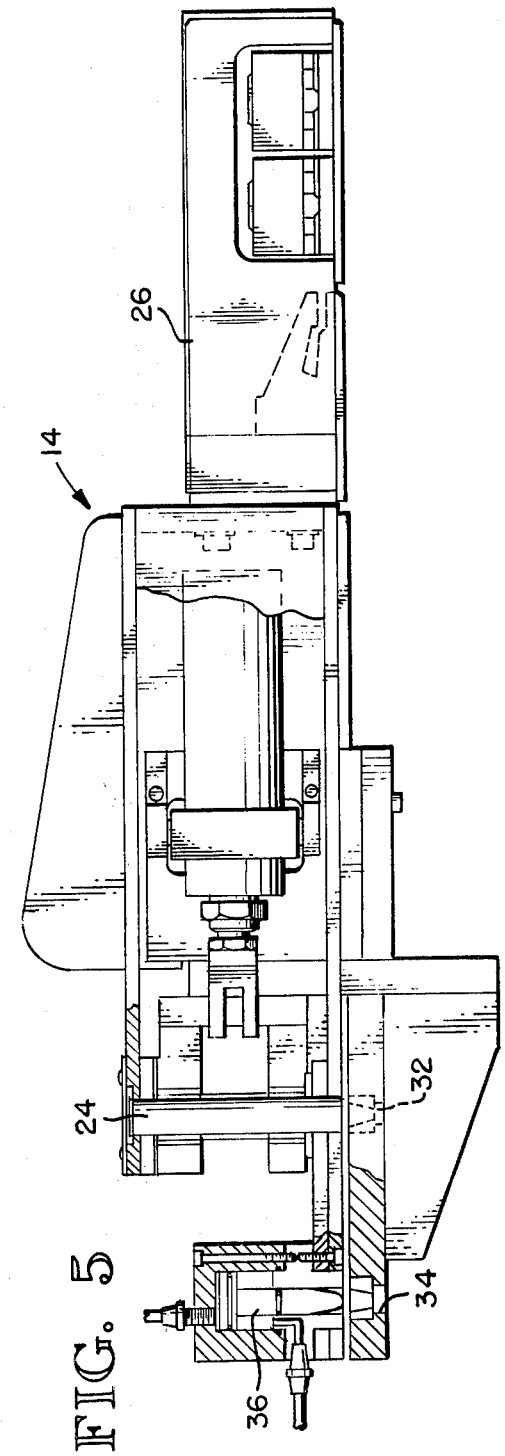
FIG. 5 is a side elevation of the sheet transfer mechanism with parts broken away for clarity.

The transfer mechanism 14 employs a base 22 (FIG. 4) rigidly mounted on the side table 20 of the punching apparatus. The base is provided with a pivot post 24. A transfer arm 26 is pivotally mounted on the pivot post 22. At its free end, the transfer arm is provided with a plurality of conventional sheet clamps 28 of the type well known in the art. These sheet clamps can be actuated to release the sheet or to clamp the sheet as desired. In the preferred form, the clamps grasp both right angle edges of one corner of the sheet as illustrated in FIG. 4.

The transfer arm is pivoted about the post 24 by a hydraulic piston and cylinder 30. As is well understood, the cylinder is secured to the base 22 while the piston rod is secured to the transfer arm 26 so that extension of the piston rod will swing the transfer arm 90° clockwise as viewed in FIG. 4.

It is important for accurately positioning a sheet in an adjacent machine or particularly for advancing the sheet through the shearing apparatus that the transfer arm be very accurately aligned relative to the base 22. For this purpose, the base 22 is provided with first and second shot pin receiving apertures 32 and 34 of the type conventionally used for aligning the turret of a punch press. The transfer arm is correspondingly provided with a pneumatically powered shot pin 36 that in a conventional manner can be reciprocated vertically to force the pin into the apertures 32 and 34 and bring the transfer arm into an exact alignment with the base. As is illustrated in the solid line position in FIG. 4, the shot pin 36 is about to be lowered into the aperture 34. With 90° of rotation of the transfer arm as is illustrated in solid lines in FIG. 1, the shot pin will be positionable within the aperture 32. Thus the shot pin and aperture latching mechanism provide very accurate alignment between the transfer arm and the base in either of its two 90° positions.

The shearing apparatus is best shown in FIGS. 2 and 3 and includes a base frame 40 and an upper frame 42. The upper frame is provided with two vertical side frames 44 and 46. The upper frame supports a die 48 which extends transversely across the upper frame 42. The die is positioned above a sheet supporting table or surface 50 having a forward or inlet end 50a and a rearward or discharge end 50b. Positioned below the die 48 is a movable shear punch 52 that is reciprocated vertically across the die by an eccentric drive 54 powered by a motor 56. The shear punch rides in guides 58 and is pinned to the eccentric by pins 60. As is readily apparent, rotation of the eccentric 54 reciprocates the shear punch 52 in the guides 58 for shearing sheets on the table 50.

The side frame member 46 is provided with an elongated opening or slot 62 that extends a substantial distance forwardly of the shear punch and die. The side opening allows transfer of large sheets onto the sheet supporting table 50 by swinging or moving the sheets laterally between the shear punch and die as the sheets are being moved onto the table. A typical illustration is shown in phantom lines in FIG. 1 in which a sheet S has a substantial area between the shear punch and die during transfer onto the shearing apparatus. The sheet in the preferred embodiment is pivoted into the full right angle position of the transfer mechanism and then is advanced past the shear punch by the sheet positioning means 18 of the punch press. Pieces cut from the sheets are carried by a ramp 64 on the rear of the shear punch 52 to a chute 66 that carries the pieces away either to a conveyor system or a collection bin. The side frame 46 above the slot 62 is in the form of a bridge structure to provide strength to resist deflection and thus mis-alignment of the punch and die. In the preferred embodiment, a C-shaped brace 70 provides added strength to resist deflection of the side frame 46.

As is readily apparent, sheets can be transferred from the punch press to the shearing apparatus through the side opening 62 and then advanced through the shear punch and die for cutting the sheet into pieces. The table 50 has a lateral extension 50 to assist in supporting the sheet as it is swung between the two apparatuses. With the use of such combined punching and shearing apparatuses, the shearing apparatus can be built less expensively since it need not have a separate set of controls and means for positioning a sheet. The side opening greatly simplifies the transfer operation for getting large sheets from the punch press into position on the shearing apparatus.

While the preferred embodiments of the invention have been illustrated and described, it should be understood that variations will be apparent to one skilled in the art without departing from the principles herein. Accordingly, the invention is not to be limited to the specific embodiments illustrated.

I claim:

1. Shearing apparatus comprising a base, sheet supporting means on said base having a forward end, sheet cutting means including a shear punch and die, each having opposite ends, means for moving said shear punch past said sheet supporting means for shearing a sheet, an upper frame on said base, means for supporting said opposite ends of said shear punch and die between said upper frame and said base, said upper frame having opposite ends attached to said base, a side opening in one of said opposite ends of said upper frame partially aligned with said shear punch and die and exposed to said one of said ends of said shear punch and die so that a sheet can be moved laterally between the shear punch and die onto said sheet supporting means.

2. The shearing apparatus of claim 1, said upper frame end having a side opening including a vertical side frame disposed at a generally right angle to said shear punch and die and extending forwardly and rearwardly of said punch and die, said side opening being provided in said side frame and extending a considerable distance toward the forward end of said sheet supporting means and forward of said shear punch and die for allowing a sheet to be swung past said shear punch and die and then fed rearwardly through said punch and die for shearing the sheet.

3. The shearing apparatus of claim 1 said shear punch lying below said sheet supporting means, said die being mounted on said upper frame, and said means for moving said shear punch being mounted on said base whereby the shear punch is raised to shear a sheet.

4. The shearing apparatus of claim 2 said sheet supporting means extending laterally beyond said shear punch and die and through said side opening for receiving a sheet being delivered to said shearing apparatus.

5. The shearing apparatus of claim 4 including means for swinging a sheet from an adjacent machine and over said sheet supporting means.

6. The shearing apparatus of claim 5 said sheet swinging means including means on said adjacent machine for advancing said sheet swinging means perpendicular to said shear punch and die for shearing the sheet into smaller parts.

7. The shearing apparatus of claim 4 said shear punch lying below said sheet supporting means, said die being mounted on said upper frame, and said means for moving said shear punch being mounted on said base whereby the shear punch is raised to shear a sheet.

8. The shearing apparatus of claim 1 including a transfer arm mechanism for sliding a sheet onto said sheet supporting means, said transfer arm mechanism including an arm pivotally mounted on a base, said base and arm having an interconnectable shot pin and aperture for accurately aligning the arm relative to said base.

9. The shearing apparatus of claim 8 including means for moving said base toward said shear punch and die for feeding a sheet past the shear punch.

10. The shearing apparatus of claim 3 including a transfer mechanism for sliding a sheet onto said sheet supporting means, said transfer arm mechanism including an arm pivotally mounted on a base, said base and arm having an interconnectable shot pin and aperture for accurately aligning the arm relative to the base and including means for moving said base toward said shear punch and die for feeding a sheet past the shear punch.

11. The shearing apparatus of claim 10 wherein said base moving means is remote from said sheet supporting means.

12. Shearing apparatus comprising a base, sheet supporting means on said base, an upper frame on said base and including opposite, transversely spaced side frames joined to said base, said side frames defining a sheet moving path therebetween, a fixed die in said upper frame extending across said sheet moving path between said side frames; a vertically reciprocable shear punch in said base, a side opening in one of said side frames for introducing a sheet between said shear punch and die laterally of said sheet moving path, means for moving said sheet along said sheet moving path, and means in said base for reciprocating said shear punch past said die for shearing a sheet in said sheet moving path.

* * * * *